(No Model.) 3 Sheets—Sheet 1.

R. B. DISBROW.
COMBINED CHURN AND BUTTER WORKER.

No. 490,105. Patented Jan. 17, 1893.

Witnesses,
C. E. Van Doren
J. S. Lyon

Inventor,
Reuben B. Disbrow,
By Paul & Merwin
his Attorneys.

(No Model.)   3 Sheets—Sheet 2.
R. B. DISBROW.
COMBINED CHURN AND BUTTER WORKER.
No. 490,105.   Patented Jan. 17, 1893.
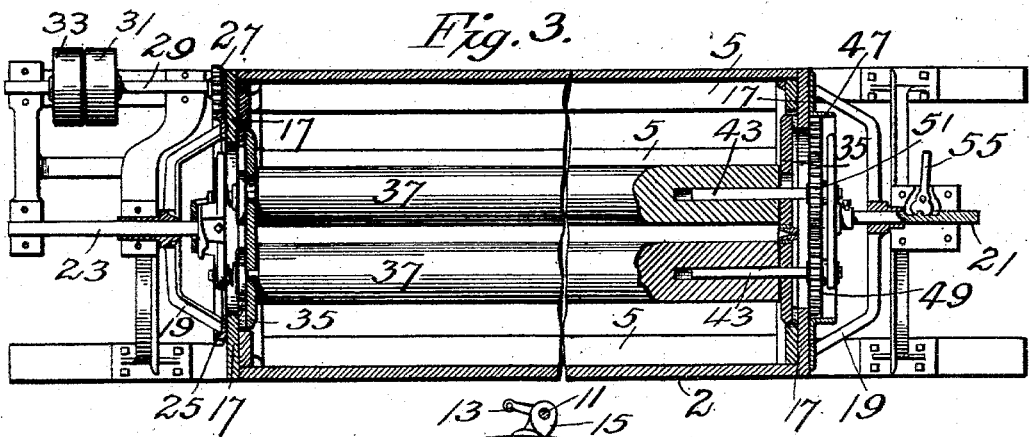
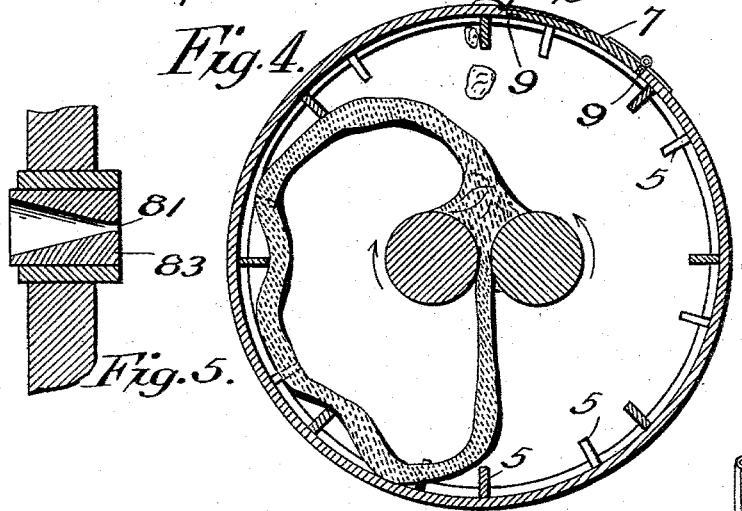
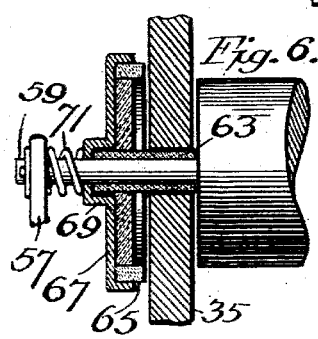
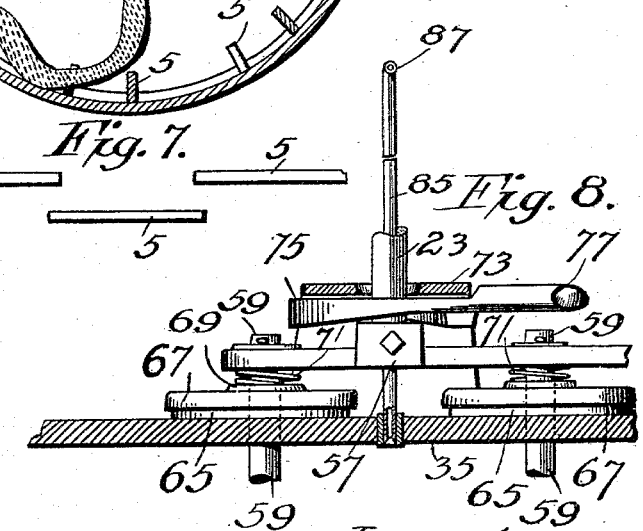
Witnesses,
C. E. Van Dorn.
P. S. Lyon.
Inventor,
Reuben B. Disbrow.
By Paul & Unwin
his Attorneys.

(No Model.) 3 Sheets—Sheet 3.
R. B. DISBROW.
COMBINED CHURN AND BUTTER WORKER.

No. 490,105. Patented Jan. 17, 1893.

Witnesses
C. E. Van Dorn
A. P. Lyon

Inventor
Reuben B. Disbrow.
By Paul & Mermun
his Attorneys.

UNITED STATES PATENT OFFICE.

REUBEN B. DISBROW, OF MINNEAPOLIS, MINNESOTA, ASSIGNOR OF ONE-HALF TO DARIUS W. PAYNE, OF SAME PLACE.

COMBINED CHURN AND BUTTER-WORKER.

SPECIFICATION forming part of Letters Patent No. 490,105, dated January 17, 1893.

Application filed August 15, 1892. Serial No. 443,070. (No model.)

*To all whom it may concern:*

Be it known that I, REUBEN B. DISBROW, of Minneapolis, county of Hennepin, State of Minnesota, have invented a certain new and useful Combined Churn and Butter-Worker, of which the following is a specification.

This invention relates to improvements in machines designed to be used both as churns and as butter workers, and especially applicable for use in creameries and other places where a large amount of butter is worked and made.

The invention consists generally in a rotating cylinder having a series of flights on its inner surface in combination with rolls arranged in said cylinder and extending longitudinally thereof, said rolls being mounted in independent heads capable of being clamped to the heads of the cylinder so as to rotate with said cylinder, in which case the rolls are thrown out of gear and rotate with the cylinder but have no rotation upon their own axes, and said head when not clamped to the heads of the cylinder, remaining stationary, and the rolls being turned by gearing and having a rotation upon their own axes, and the butter being carried up by the flights on the inner surface of the cylinder and dropped upon said rolls so that it is squeezed between the rolls, drops into the lower portion of the cylinder and is again carried up to be again dropped on the rolls as before.

The invention consists further in the construction and combination hereinafter described and particularly pointed out in the claims.

Figure 1:
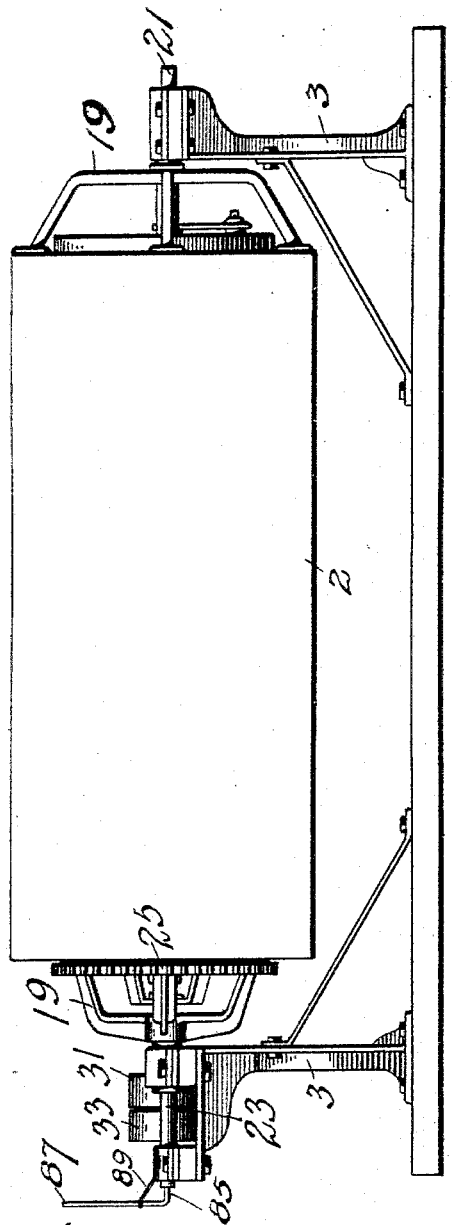
Figure 2:
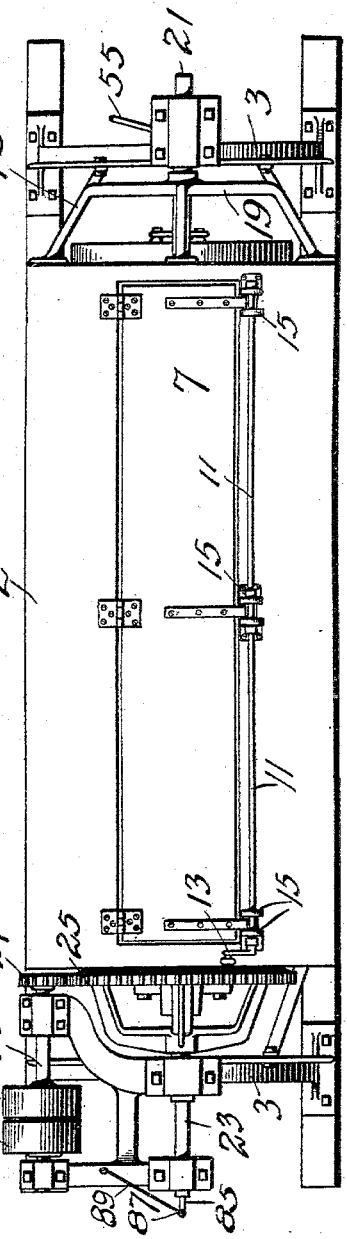
Figure 9:
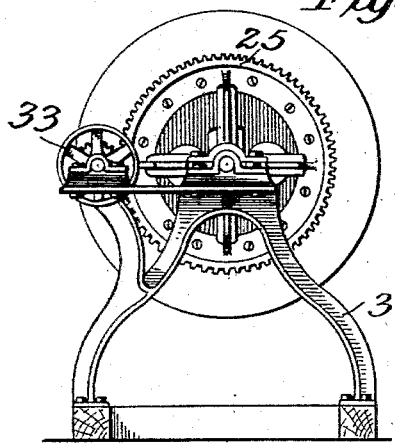
Figure 10:
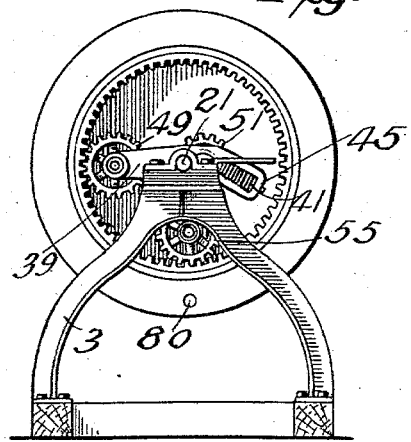
Figure 11:
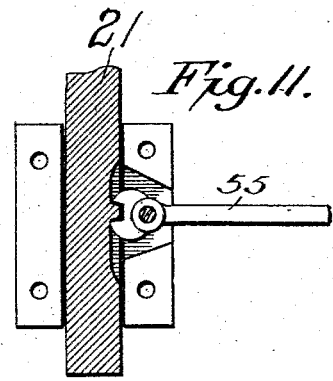
Figure 12:
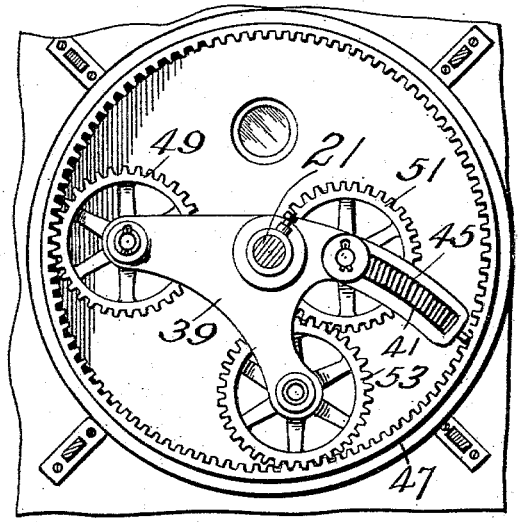
Figure 14:
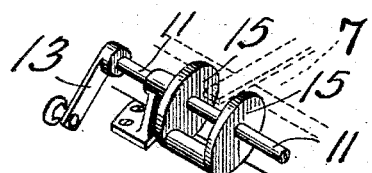
Figure 13:
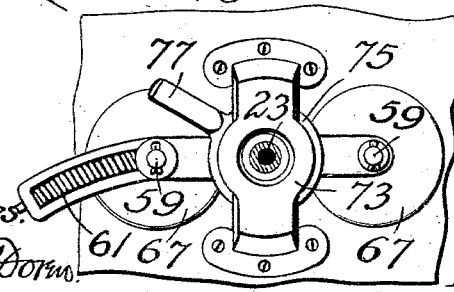

In the accompanying drawings forming part of this specification; Figure 1 is a side elevation of my improved machine. Fig. 2 is a plan view of the same. Fig. 3 is a longitudinal section showing the rolls partially broken away. Fig. 4 is a transverse vertical section. Figs. 5, 6, 7, and 8 are details. Fig. 9 is an elevation of one end of the machine. Fig. 10 is an elevation of the other. Fig. 11 is a detail of the means for throwing the roll gearing into or out of action. Fig. 12 is an elevation of a portion of one end of the machine. Fig. 13 is a detail of the means for supporting the rolls. Fig. 14 is a detail of the door fastening device.

In the drawings, 2 represents the cylinder of the machine which may be of any suitable size and construction.

3—3 represent the supporting standards by which the cylinder is supported and upon which it turns. The cylinder is provided upon its inner surface with a series of flights or carriers 5, said carriers being preferably arranged in short lengths alternating with each other so as to form no obstruction to the running down of the buttermilk over the inner surface of the cylinder when the machine is in use or when the milk is to be drained off. The cylinder is provided in its circumference with one or more doors 7, preferably hinged to the body of the cylinder and arranged to make a tight joint therewith, preferably by means of the cork packings 9.

A shaft 11 is mounted in lugs upon the surface of the cylinder and is provided with the operating handle 13 and with the locking cams 15. This shaft may be turned so as to cause the cams to unhinge upon the surface of the door and firmly press the same into position and lock it, as shown in Fig. 4.

The cylinder is provided with the open heads or ends 17 and to these heads are secured the spiders 19, said spiders being journaled upon the stationary shafts 21 and 23, said shafts being stationary in the sense that they have no rotatory movement but being capable of longitudinal movement in their bearings, said shafts being also supported in suitable bearings in the standards 3.

At one end of the cylinder outside of the spider 19 is the ring gear 25, which is engaged by the pinion 27 upon the shaft 29, said shaft being provided with fast and loose pulleys 31 and 33. By this means when power is applied to drive the shaft 29 the cylinder 2, through the pinion 27 and the gear 25, will be rotated with it. When it is desired to stop the machine the driving belt may be shifted to the loose pulley when the motion of the cylinder will cease. The spider at the opposite end of the cylinder is, as before stated, mounted upon the shaft 21 and turns freely thereon. Arranged inside of the cylinder heads are the independent disks or heads 35, and in said heads are journaled the rolls 37 extending longitudinally in said cylinder and occupying preferably a substantially horizontal position therein. These rolls are provided with journals at each end and said journals are provided with bearings that are supported upon the stationary shafts 21 and 23.

Secured upon the shaft 21 is the plate 39. This plate is provided with a bearing for one of the rolls and with a slot 41, in which the journal of the other roll is arranged. The rolls are provided at this end of the machine with the journals 43, said journals being of rectangular shape at their ends and engaging rectangular sockets or openings in the ends of the rolls, whereby said journals are capable of longitudinal movement in said sockets and at the same time said journals and rolls must necessarily rotate together. The outer ends of the journals are of circular form and are capable of turning in their supports, one of said journals being mounted in the slot 41 and held against the inner end of the slot by means of the spring 45 that is arranged in said slot. Upon this end of the cylinder is the internal ring gear 47. Upon one of said journals 43 is a pinion 49 that engages said gear, and upon the other journal is a pinion 51. The pinion 53 is mounted in bearings upon the plate 39 and also engages the gear 47 and engages the pinion 51. By this means when the pinions 49 and 53 are in engagement with the ring gear 47 and the cylinder is rotated the rolls 37 will be driven in opposite directions as indicated by the arrows in Fig. 4, consequently if there is any butter in the cylinder it will be carried up by the flights on the inner surface of the cylinder and will be dropped between the rolls, will pass between them and fall into the lower part of the cylinder and be again carried up by the flights as before. This operation will continue indefinitely.

The shaft 21, as before stated, is capable of moving longitudinally in its bearings and a pivoted lever 55 is arranged to engage said shaft and move the same in either direction. By moving the shaft 21 the plate 39 and the journals 43 are moved with it, said journals sliding in the sockets in the ends of the rolls. By throwing this shaft outward the pinions 53 and 49 may be moved out of engagement with the gear 47 so that thereafter the rolls 37 will have no movement upon their own axes.

When the machine is to be used as a churn it is desirable to clamp the heads 35 upon the heads 17, so as to cause the same to move together and form a tight joint between them.

Secured upon the end of the shaft 23 is the plate 57, which is provided with bearings for the journals 59 at that end of the machine. The bearing for one end of said journals is slotted and is provided with the spring 61, corresponding to the spring 45 at the opposite end of the machine, engaging the journal of the same roll. By this means, one of said rolls is mounted in yielding bearings and is capable therefore of movement away from or toward the other roll.

Arranged upon each journal 59 is a wooden sleeve 63 that covers said journal and prevents contact of any of the cream in the cylinder with said journal. Outside of said head 35 and surrounding said journal is the cork ring 65 and the wooden cap 67, over which is the metal cap 69, against which bears the spring 71, the opposite end of said spring engaging the plate 57. A plate 73 is secured to the head 35 outside of the plate 57 and the shaft 23 passes through an opening in said plate 73. The cam disk 75 surrounds the shaft 23 between the plate 73 and the plate 57 and is provided with the handle 77. When the rolls are out of gear, by moving the lever 77 the head 35 at that end of the machine will be thrown against the head 17 of the cylinder making a tight joint therewith and clamping said heads together. At the same time and through the same lever and cam disk the rolls 37 will be forced toward the opposite end of the machine, and coming in contact with the inner surface of the head 35 at that end of the machine and forcing said head against the cylinder head 17, thereby a tight joint will be formed between said heads 17 and 35 and a tight joint will also be formed between the ends of the rolls and the head, preventing the escape of any cream or material through the opening in the head 35 through which the journal 43 extends. At the same time the said rolls and the head 35 will be firmly clamped to the cylinder head and said rolls will partake of the rotary movement of the cylinder but will have no movement upon their own axes. The machine is now in condition to be used as a churn, the cream being placed therein and being turned about and formed upon said roll. As soon as the butter has been formed the butter-milk may be drawn out through a drain opening 80 in the lower part of the cylinder, the heads 35 may then be unclamped, the rolls thrown into gear with the cylinder and the butter completely worked without being removed from the machine. I also prefer to provide one of the heads 35 with the vent opening 81, said opening being preferably provided with the cork lining 83 and being of tapering form so that any of the cream which may collect therein will work back into the body of the cylinder.

I prefer in some instances to provide a vent tube that will take the place of the vent 81 herein shown, and for this purpose I prefer to provide a tube 85 that is arranged to extend through the shaft 23, said shaft in this instance being made hollow for this purpose as shown in Figs. 1 and 8. Said tube 85 extends through the shaft and through the head 35 and its outer end 87 is turned upward so as to prevent the possibility of any cream escaping through the tube in case the churn is filled with cream to a point above the vent opening, which in this instance would be in the center of the churn. As the shaft 23 rotates when the machine is being used as a churn I provide a rod 89 or other suitable device for holding the tube 85 stationary with its end 87 projecting upward.

I claim as my invention:

1. The combined churn and butter worker herein described comprising the cylinder, means for rotating said cylinder, said cylinder being provided with heads having open centers, independent heads arranged in said cylinder and supported independently thereof rolls arranged in said cylinder and mounted in said heads, and means for rotating said rolls.

2. The combination with the cylinder, provided with the heads having the open, central portions, heads 35 mounted in said cylinder and arranged to cover the open portions of the cylinder heads, independent means for supporting said heads 35, rolls 37 arranged in said cylinder and mounted in said heads 35, means for rotating said cylinder and means for connecting said rolls with said cylinder so as to be rotated therewith, and means for disconnecting them from said cylinder, substantially as described.

3. The combination, with the cylinder 2, provided with heads having open central portions, of the independent disks or heads 35 arranged to cover said open portions of the cylinder-heads, the rolls 37 mounted in said heads 35, and means for clamping said heads 35 to said cylinder heads so as to cause said heads 35 to be rotated with said cylinder, substantially as described.

4. The combination with the cylinder, having the heads with the open central portions, the rolls arranged in said cylinder and provided with journals extending through the open portions of the cylinder heads, means for supporting and rotating said cylinder, independent means for supporting and rotating said rolls, and the heads or disks 35 arranged to close the open central portions of the cylinder-heads.

5. The combination with the cylinder, provided with heads having open central portions, rolls mounted in said cylinder and provided with journals extending through the open portions of the cylinder heads, disks or heads 35 for closing the open portions of said cylinder heads, means for driving said cylinder, and means arranged to connect said rolls with said cylinder, or disconnect them therefrom, and means for clamping said heads 35 to the heads of the cylinder, substantially as described.

6. The combination with the cylinder, provided with heads having open central portions, the rolls 37 mounted in said cylinder and provided with journals extending through the open portions of said cylinder heads, the disk 35, means for clamping said disks to the cylinder heads, means for driving said cylinder, gearing connecting said rolls with said cylinder, and means for throwing said gearing into or out of operation, substantially as described.

7. The combination, with the cylinder and the heads 35, of the rolls mounted in said cylinder and provided with journals extending through said heads, the sleeves 63 surrounding said journals, and the disks 67 outside of said heads, the ring 65 surrounding said disks, and the cap-plates 69 arranged over said disk, substantially as described and for the purpose set forth.

8. The combination with the cylinder, the heads 35, and the rolls 37, of the shaft 23 provided with the plate 57 in which the roll journals are mounted, the wooden sleeve 63, surrounding said journal, the wooden disk 67 and cork ring 65 surrounding said journal outside of said head 35, the plate 73 secured to the disk 35, and the cam ring 75 provided with the handle 77, all substantially as described.

9. The combination with the cylinder, provided with the flights upon its inner surface and with the heads having open central portions, of the independent heads 35, the rolls 37, located in said cylinder, with their journals extending through the heads 35 and through the open central portions of the cylinder heads, means for supporting said rolls, means for driving said cylinder, means for connecting said rolls with said cylinder or disconnecting them therefrom, and means for clamping said heads 35 to the cylinder heads, for the purpose specified.

10. The combination with the cylinder, provided with the spiders 19, the longitudinally movable shafts 21 and 23 upon which said spiders are mounted, plates upon said shaft, rolls 37 provided with journals mounted in the spiders upon said shafts, the heads 35, means for driving said cylinder and means for driving said rolls from said cylinder, substantially as described.

11. The combination with the cylinder, and the rolls arranged therein, of the sliding journals 43, the plate in which said journals are mounted, the shaft 21 to which said plate is secured, and the lever for moving said shaft, substantially as described.

12. The combination with the cylinder, and the head 35, the rolls and the hollow shaft 23, provided with a plate supporting the journals of said rolls, of the vent tube 85 extending through said hollow shaft and through the head 35 and provided with the upturned end 87, substantially as described.

In testimony whereof I have hereunto set my hand this 10th day of August, 1892.

REUBEN B. DISBROW.

In presence of—
A. C. PAUL,
F. S. LYON.